(No Model.)
G. H. REGAR.
CLOTHES LINE HOLDER.
No. 428,412. Patented May 20, 1890.
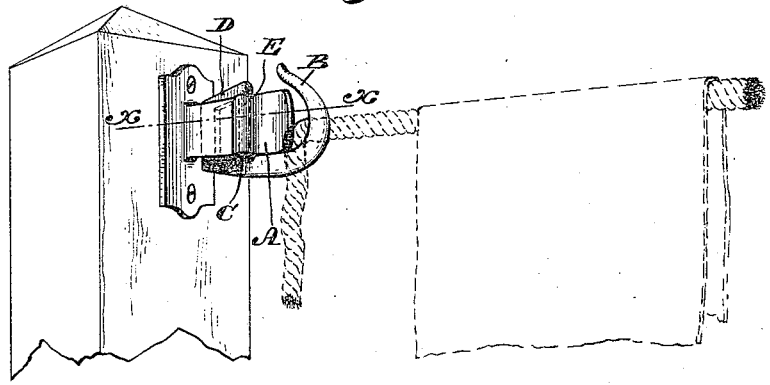
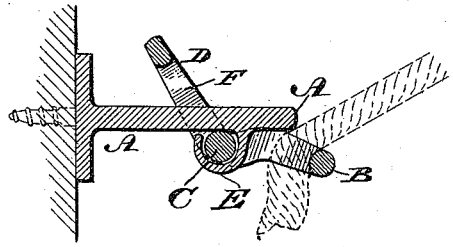
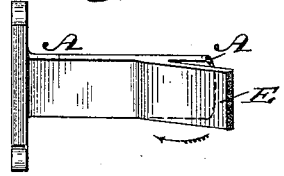
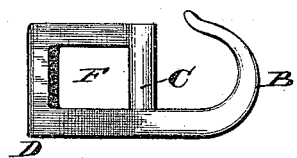
WITNESSES:
L. Douville
P. F. Eagle
INVENTOR
George H. Regar
BY John A. Wiedersheim
ATTORNEY.

UNITED STATES PATENT OFFICE.

GEORGE H. REGAR, OF PHILADELPHIA, PENNSYLVANIA.

CLOTHES-LINE HOLDER.

SPECIFICATION forming part of Letters Patent No. 428,412, dated May 20, 1890.

Application filed December 21, 1889. Serial No. 334,490. (No model.)

*To all whom it may concern:*

Be it known that I, GEORGE H. REGAR, a citizen of the United States, residing in the city and county of Philadelphia, State of Pennsylvania, have invented a new and useful Improvement in Clothes-Line Holders, which improvement is fully set forth in the following specification and accompanying drawings.

My invention consists of a clothes-line holder formed of a hook which is adapted to hold the line and clamp it against a jaw, whereby slipping of the same is prevented.

Figure 1 represents a perspective view of a clothes-line holder embodying my invention. Fig. 2 represents a horizontal section thereof on line *x x*, Fig. 1. Figs. 3 and 4 represent side elevations of the parts of the holder in separated condition.

Similar letters of reference indicate corresponding parts in the several figures.

Referring to the drawings, A designates a jaw, which is adapted to be screwed, nailed, or otherwise secured to a fence, post, &c.

B designates a hook, which is connected by an axial post C to the jaw A, said hook occupying a vertical position in front of the jaw A, so that a clothes-line placed on the hook may be pressed against the jaw, as most plainly shown in Fig. 2. The hook has secured to or formed with it an arm D, the same extending rearward of the pivot C, and constituting a handle whereby the hook may be readily moved more particularly for opening purposes, in order to release the line.

It will be seen that when the line is placed on the hook and drawn taut the hook moves toward the front portion of the jaw A and clamps the line thereagainst, forming a bite, which prevents the line from slipping.

When the handle D is drawn outwardly, the hook with the line thereon is carried from the jaw and cleared of the latter, so that the line may be readily removed from the hook when so desired.

As shown in Fig. 3, the jaw is primarily formed with a lip E, the same being on the side thereof, and constructed of metal that may be bent. The arm or handle D has a recess or slot F, which admits of the same being passed over the lip and jaw, so as to locate the hook. The lip is then bent around the post C, which is at the side of the slot F, thus forming a hinge on which the hook turns in its opening and closing motions, thus avoiding a separate pivot-pin and providing a strong connection of the hook with the jaw, as well as producing an inexpensive and serviceable device.

Having thus described my invention, what I claim as new, and desire to secure by Letters Patent, is—

1. The hook having a post and an arm provided with a recess, in combination with the jaw having a lip around said post, the jaw and lip passing through said recess, substantially as and for the purpose set forth.

2. The movable jaw having a hook, a post, and an arm with a recess therein, in combination with a stationary jaw provided with a lip located around said post, and a projecting end adjacent to said hook, substantially as described.

GEORGE H. REGAR.

Witnesses:
JOHN A. WIEDERSHEIM,
A. P. JENNINGS.